Nov. 27, 1934. H. SALMON ET AL 1,982,485
STORAGE BATTERY GRID
Filed March 28, 1931 2 Sheets-Sheet 1
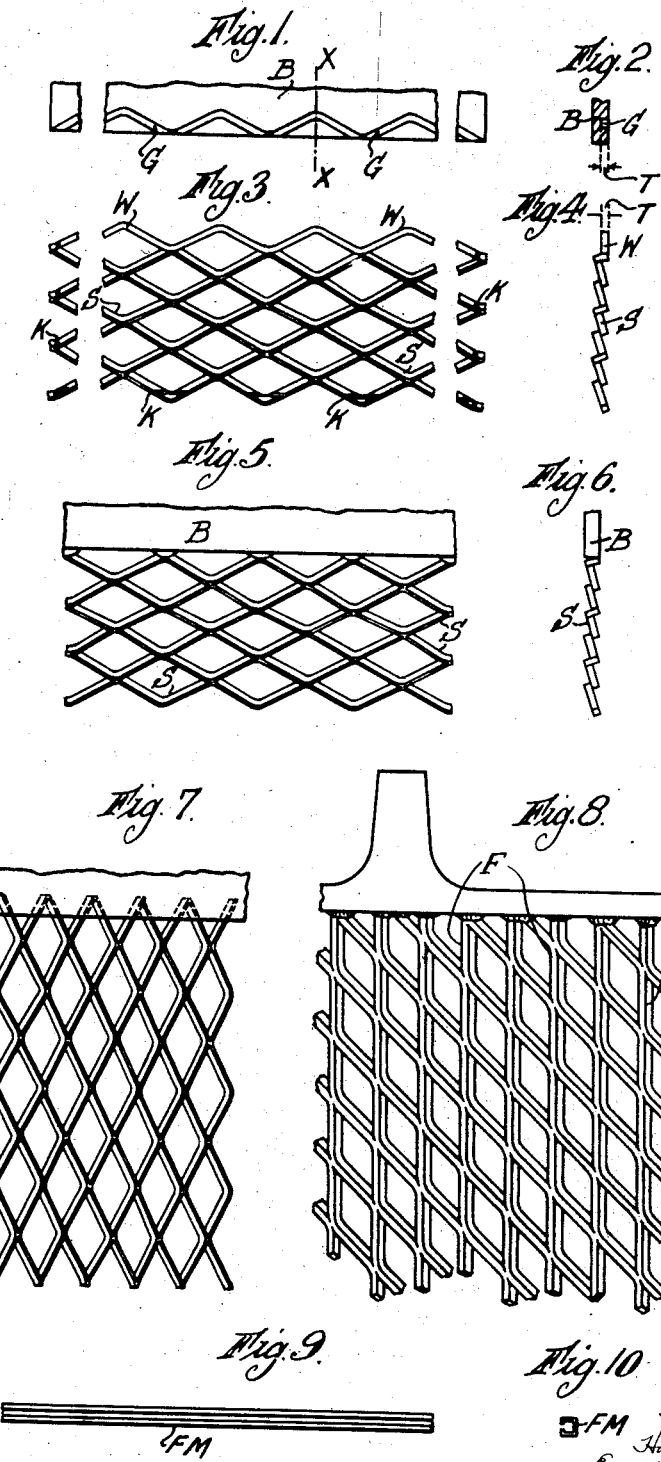

Nov. 27, 1934.  H. SALMON ET AL  1,982,485
STORAGE BATTERY GRID
Filed March 28, 1931  2 Sheets-Sheet 2
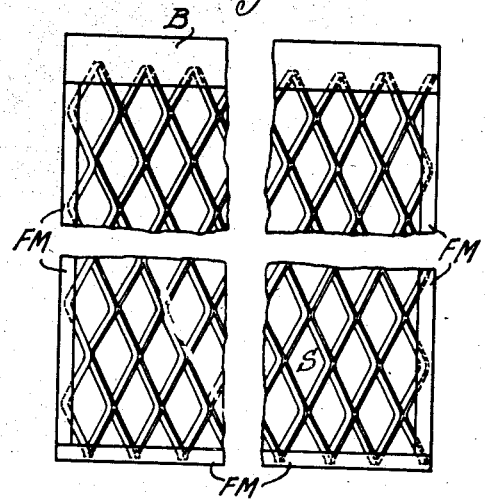
Fig. 11
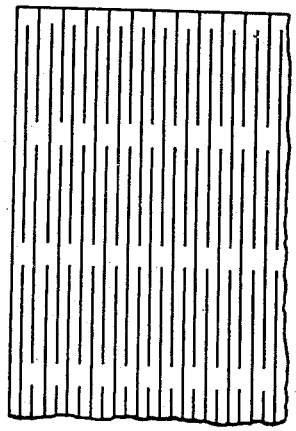
Fig. 12
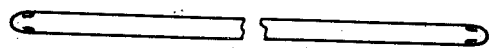
Fig. 12a
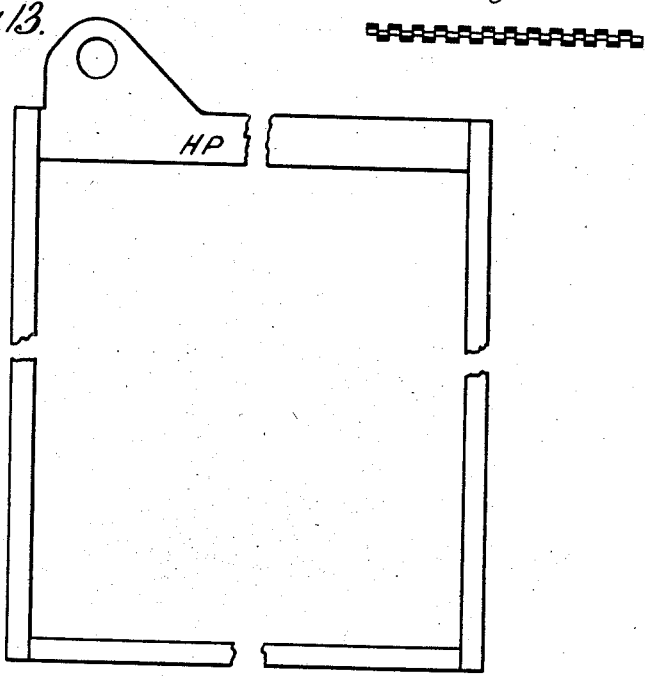
Fig. 13
Fig. 14
Inventors
Harry Salmon
Ernest T. Williams
By their attorneys,
Baldwin & Wight Patented Nov. 27, 1934

1,982,485

UNITED STATES PATENT OFFICE 1,982,485

STORAGE BATTERY GRID

Harry Salmon, Westminster, London, and Ernest Thomas Williams, Golders Green, London, England, assignors to The Expanded Metal Company, Limited, London, England Application March 28, 1931, Serial No. 526,060
In Great Britain April 9, 1930

4 Claims. (Cl. 136—36)

This invention relates to electric accumulators, and more particularly to the construction and arrangement of the grids or equivalent structures employed in such accumulators to support or act as the base of the active material.

More especially the invention as to its main features relates to accumulators in which the grid or equivalent active material carrying structure is constituted by one or more sheets of expanded lead or lead alloy. In such electric accumulators, the sheet or sheets may be supported or sustained by a substantially rigid framework, whereby the completed element for the accumulator is given the required degree of stiffness.

The present invention has for one of its objects to provide simple and efficient means, whereby the expanded metal portion of a grid or equivalent structure, may be associated with one or more solid rigid carrying and/or stiffening members, e. g. with a member which acts as a "head-piece" to the said expanded portion, and serves to support it in position in the accumulator and to carry such terminal and/or connecting lugs as may be required.

Another object of the invention is to provide an extremely durable and efficient grid structure of expanded lead in which the lead shall be as nearly as possible homogeneous in quality and close in texture, and which shall be adapted to retain active paste very firmly against dislodgement under the effects of vibration, and so forth.

According to one feature of this invention, the expanded metal portion of the grid or equivalent structure of an accumulator, as above described, is carried in and/or stiffened by one or more solid rigid plates or bars of lead formed with grooves and shaped to receive the expanded metal (e. g. the wave-like formation of one edge of the expanded metal sheet) so that the said expanded metal (e. g. the said edge) may be located in said grooves and fixed into position there. Preferably the parts of the expanded metal sheet which are fitted into the bar or bars or the like are burnt together or welded by the usual means in position in the grooves so that after the burning or welding operation, the expanded metal and the rigid bars may be regarded for most practical purposes as forming a unitary homogeneous structure.

A second feature of the invention is concerned with the construction of the expanded metal itself. As is well known, there are a number of methods of manufacturing the material known as expanded metal, but in general these methods fall under two heads. In the first of these classes of methods, a sheet to be expanded is in the act of expanding, widened in one direction, and therefore shortened in the direction at right angles thereto. For example, in one such method, a sheet to be expanded is first slitted and is then forcibly pulled (for example by passing it through diverging guides) so that the slits (whose lengths are at right angles to the direction of divergence) are widened out into gaping, roughly diamond shaped openings. The width of the whole sheet is thus considerably increased, and as a result, the length of the sheet i. e. the dimensions at right angles to the direction of divergence, becomes diminished. In the second class of method, however, the sheet which is to be "expanded" (this term, as will be apparent, is not really accurate as applied to the product manufactured in the way now being described) does not alter in overall width during the expanding process at all, the material itself being deformed to produce the desired result. Material manufactured by the second class of method will be hereinafter referred to as "punched" expanded metal.

In one method of manufacture of this class, the sheet to be "expanded" is fed in steps between a reciprocating punch or press, the sheet being normally fed horizontally and the punch or press reciprocating vertically. The co-operating tools of the punch or press are so shaped that as each strip of sheet is engaged, the said strip is bent substantially through a right angle with respect to the main sheet, and the material thereof slitted and the strands formed thereby forcibly punched and stretched in the one operation, so as to be shaped into the familiar diamond shaped mesh. Hitherto choice between the two classes of methods of manufacture in so-called expanded metal has been determined by considerations of expediency, and it has been assumed that the products of the two methods are for practical purposes approximately the same. This assumption is probably quite sound as regards the ordinary and more general use of expanded metal, e. g. as regards expanded steel employed in building and other constructions.

It has now been found, however, that with expanded lead for the special purpose of employment in accumulator grids, the products of the two methods of "expansion" cannot be regarded as equivalent to one another, the fact being that the product of the second class of method (punched expanded lead) is considerably superior to that of the first. It is found that probably, as a result of the punching operation, the lead in the finished product is, as it were, in a highly compressed state and substantially free from blow-holes, with the result, of course, that the material in the said finished product is highly homogeneous. Further, the shape of the mesh in punched expanded metal differs from that of the mesh in metal manufactured by a method falling within the first class of methods. This difference, though not large to the eye, is of considerable importance for the special purpose of accumulator grids, in that it provides a "keying" feature which is valuable in holding the active paste. Yet another advantage of punched expanded metal lies in the improved uniformity and regularity of mesh obtained. It will readily be appreciated that although these differences are, as regards the purpose for which expanded metal has hitherto commonly been employed, e. g. in building operations, of very small magnitude, so that they may, for such purposes, be disregarded, in the case of accumulator grids uniformity and homogeneity of material are of great importance, while the ability to retain active paste against the effects of vibration and so forth is highly desirable, and in practice by no means easy to attain.

According to the second feature of this invention, therefore, an accumulator grid or the like is formed of punched expanded sheet lead or lead alloy.

It has been proposed before to manufacture an accumulator grid construction in which the active material is carried by a base of expanded lead or lead alloy, the advantages of the use of expanded material for this purpose being that inter alia it is easy to manufacture and is of such a nature as to hold the active material in a very satisfactory manner against the effects of vibration and so forth. Very satisfactory results may however be obtained by substituting for a sheet or sheets of expanded material in such an accumulator construction by one or more sheets of metal which are slitted with a plurality of closely spaced slits the metal between said slits being pushed or bowed out of the normal plane of the unslitted sheet.

Preferably the slits are very close together and in parallel rows the slits in each row being parallel to one another and slits in alternate rows overlapping into the spaces between alternate slits in the next row. The intermediate product obtained after slitting, but before expanding in the manufacture of so-called expanded metal consists of sheet metal slit in this way, and preferably the material employed in an accumulator grid in accordance with this feature of the invention is this intermediate product. As is well known in one method of manufacturing expanded metal a sheet of metal is passed between a pair of slitting rollers which are provided with slitting teeth and the sheet when it emerges from this roller is passed between divergent guides whose length is in the direction of the slits so that the said sheet is stretched out so as to open it into the familiar characteristic diamond like mesh. Material which it is preferred to employ in carrying out the present feature of this invention is the intermediate product constituted by a sheet as it comes from the slitting rollers and before expansion. It will be obvious that such material is very cheap and easy to manufacture.

The use of expanded or intermediate expanded material in accumulators is not confined to the application of expanded or intermediate expanded metal to grids or equivalent structures and considerable practical advantages can be obtained by making the insulating separator or separators for use between the plates of an accumulator of expanded or intermediate expanded insulating material i. e. of insulating material which has been treated so as to shape it into a form similar to that of the material known as "expanded" metal or herein described as "intermediate expanded" metal. Expanded or intermediate expanded insulating separators may be made of any convenient or usual insulating material, e. g. mechanically treated wood, ebonite, or rubber composition, or celluloid.

In a preferable manner of manufacturing an insulating separator a prepared sheet of rubber composition is employed. This sheet is partially vulcanized so as to be sufficiently stiff to be passed through a suitable cutting machine e. g. between slitting rollers and then expanded. After expansion, the vulcanization process is completed to the degree necessary to constitute a separator of the desired stiffness and other qualities. Alternatively, in place of employing two vulcanization steps the rubber may be vulcanized in a single step before slitting and expanding.

Although in many cases insulating separators may be made by a method of manufacture which consists in employing hot rollers and if desired divergent guides for stretching the projection obtained over such rollers, it is obvious that the actual method of manufacture employed may be one of any of a number of available methods the chosen method in any particular case being determined with regard to the mechanical and other properties of the material employed. For example, with certain materials it will be found necessary or desirable to manufacture an insulating separator in accordance with the present invention by stamping or pressing rather than by a slitting and stretching process.

If desired insulating material e. g. ebonite or rubber composition may also be employed to constitute an edge and/or bottom framing member for an expanded or intermediate expanded lead or lead alloy accumulator grid. In one construction of the kind an expanded lead accumulator grid is grooved or saw-cut on each face down each side parallel to and close to each side edge and along the bottom parallel to and close to the bottom edge. Ebonite edge and bottom framing members of approximately C section are then placed in position the open ends of the C fitting into the appropriate grooves or saw-cuts so that the side edges and bottom edge of the expanded sheet lie within the ebonite or other edge framing members. The C section edge and bottom framing members are of course cut to the required lengths before being slid into position on the sheet.

The invention is illustrated in the accompanying drawings which show various arrangements in accordance therewith.

In the drawings:

Figure 1 is a front view of a framing member in accordance with the invention;

Figure 2 is a sectional view of the member shown in Figure 4, the section being taken on the line X—X of Figure 1;

Figure 3 is a front view of a sheet of expanded metal adapted to form part of the grid;

Figure 4 is a view in side or end elevation of the sheet of expanded material shown in Figure 3;

Figure 5 is a front view of one form of grid structure;

Figure 6 is a view in side or end elevation of the structure shown in Figure 5;

Figure 7 is a front view of a modified construction;

Figure 8 is a front view of a further modification;

Figure 9 is a view in elevation of a framing member;

Figure 10 is a view in side or end elevation of the member shown in Figure 9;

Figure 11 is a front view of a grid construction in which framing members such as are shown in Figures 9 and 10 are employed;

Figure 12 is a front view of a sheet of slitted lead which may be employed in carrying out the invention in a Planté lead grid;

Figure 12a shows a transverse section of the sheet shown in Figure 12;

Figure 13 is a view in front elevation of a carrier frame adapted for supporting grids comprising sheets such as are shown in Figures 12 and 12a; and Figure 14 is a plan view of the frame shown in Figure 13.

Referring to Figures 1 and 2, these show respectively in front view and side section on the line X—X of Figure 1, a bar B of lead, which is to act as a carrier for the sheet S of "punched" expanded metal, part of which is shown separately in front view in Figure 3, and in side view in Figure 4. The bar B is stamped or otherwise preformed with wave-like grooves G of shape, size and disposition corresponding to the shape, size and disposition of the wave-like edge W of the sheet S. The depth of the groove G is substantially equal to the thickness T of the material in the said wave-like edge. The thickness of the bar B is preferably approximately equal to twice the thickness T.

In assembly, the edge W is placed in the grooves G and welded or burnt in position, for example, by arc welding or flame burning so that what is in effect a unitary structure, as shown in front and side views in Figures 5 and 6 is obtained.

Preferably the sheet of expanded metal is slightly bent (if required) so as to cause it to lie in the same plane with the carrier bar B, as shown in Figures 4 and 6.

It will be noted that the individual meshes in the "punched" expanded metal lie at a slight angle to the plane of the whole sheet, i. e. they have a slight twist and this results in a shape which gives a valuable keying action for holding active paste.

It will be seen that this arrangement provides a very easy and simple method of mounting the punched expanded metal grids in such a way as will result in great strength and good electrical contact with resulting high conductivity. Further, since the sheet and carrier bar may, as stated, be arranged to lie in one plane, there are no side projections, due to the method of fixing the sheet to the carrier, while the thickness of the whole of the assembled device need not be any greater than the overall thickness of the carrier bar B itself.

If desired, solid rigid stiffening members (not shown) may be provided at the bottom and/or in any other position upon the sheet of expanded lead, in addition to or in place of the stiffening bar shown in the drawings at the top of the sheet. The bottom stiffening bar would preferably be provided in the same way, as has been illustrated for a top bar in the drawings. In the case of bars along the edges of the sheet or across the main body of the sheet, the grooves in the said bars should preferably be shaped to receive the mesh at the positions in which the bars are to be fixed. If desired, side edges to the sheet may be spot welded or burnt or otherwise suitably fixed to side frame members (not shown) so as to provide additional rigidity. In the case of very low grids for example strengthening rigid cross pieces may be provided these pieces being either grooved as above described or simply burnt or otherwise fixed to the sheet without grooving. Alternatively the grid may comprise a plurality of sheets of expanded metal in the same general plane these sheets being joined by strengthening cross pieces to which their edges are welded or otherwise fixed. It will be appreciated that a stronger structure is probably obtained when the side members are grooved to receive the expanded metal, as illustrated in the drawings, for the top member, rather than merely spot welded thereto.

Obviously in place of electric welding, any other suitable method of fixing may be resorted to, for example, burning.

It is of course not necessary for the sheet of expanded metal to be so arranged that the longer dimension of the mesh is horizontal. For example Figure 7 shows part of an accumulator grid in which the mesh is vertical while Figure 8 shows a construction in which the mesh is given such bias that the "spine" of the expanded metal (indicated by F) is vertical. This construction gives a very strong grid.

Figure 3 is also utilized to illustrate a method whereby an edge framing of insulating material e. g. rubber composition or ebonite may be provided. For this purpose the expanded sheet is grooved as is indicated at K, said grooves running on both sides of the sheet parallel to and adjacent the edges and bottom of the sheet as shown. Into these grooves are slid the open ends of C-shaped ebonite or similar framing members FM one such member being shown in elevation in Figure 9 and in end view in Figure 10. A sheet thus framed is shown in Figure 11.

Figure 12 shows in elevation and Figure 12a in transverse section (both enlarged) a portion of a sheet of slitted lead which may be employed in carrying out this invention e. g. in a Planté lead accumulator grid. Such sheets may be obtained by passing lead sheets between slitting rollers as in the manufacture of expanded metal. A plurality of such sheets are superimposed with slight spacing between sheets and are carried in a carrier frame comprising a pair of vertical side members of U-section. These side members constitute the side edges of the accumulator grid structure the sheets of intermediate expanded metal being pushed into the U-sections which are then clamped or otherwise deformed to retain the pieces in position. If desired the superimposed intermediate expanded metal sheets may be so arranged that the slits in adjacent sheets are mutually perpendicular. The grid structure thus constituted is placed in an acid bath in co-operation with a complementary electrode and active material is formed thereon by repeated charging and discharging in accordance with the well-known process for the manufacture of Planté cells.

A suitable U-sectioned frame is shown in elevation in Figure 13 and in plan in Figure 14. A header or terminal piece HP may be welded or otherwise fixed (as shown in Figure 13) to the frame.

In place of using a U-frame the grid structure may incorporate header and if desired side and bottom members cast on as in manner known per se.

In many cases more particularly in cases where grid structures of large area are required, it will be found convenient or desirable to provide the slitted sheets with stiffening or strengthening portions of unslitted material.

Where intermediate expanded metal is employed such stiffening or strengthening members may be easily obtained in the manufacture of intermediate expanded metal by suitably grooving or cutting out the slitting rollers; for example, where a solid strengthening member running in a direction parallel to the length of the slits is required, this member may be obtained by providing the slitting rollers with peripheral grooves so that no slitting occurs under the grooves since, of course, the sheet passing between the rollers will not be engaged thereby at the grooves. Where a strengthening or stiffening solid portion is required in a direction running at right angles to the slits, this may be obtained by providing one or both of the slitting rollers with one or more longitudinal grooves i. e. grooves running parallel to the axes of the rollers. Similarly, stiffening or strengthening portions in angular directions may be obtained by grooving or cutting away the slitting rollers in the required manner. If it is desired the tops and bottoms of intermediate expanded sheets may be left solid for convenience for carrying the slitted sheets in the accumulator and for convenience in making connection to the said sheets. Such unslitted tops may thus serve as connecting heads or where desired they may be thickened to form thicker connecting heads by casting or otherwise fixing additional material thereon.

Though the invention has been more particularly described in its application to Planté lead accumulator grids it is not limited to such application. The invention is also applicable to semi Planté and to Faure grids and to accumulators other than lead accumulators e. g. to nickel-alkali batteries and other batteries.

It will be appreciated that the use of intermediate expanded material enables a very considerable increase in effective area to be obtained. In face where the slits are close together an increase of surface area of over 50% as compared to a plane surface can be obtained. When regard is paid to the mechanical characteristics of a grid so made it will be seen that this increase of surface is very considerable and that substantial practical advantages are offered over known proposals for increasing the surface of accumulator grids, e. g. by stamping and pressing out portions of it.

Obviously material having appearance and qualities substantially identical with that of the material herein termed intermediate expanded material may be made by methods other than as above described, for example, a sheet may be manufactured by direct stamping. In general, however, it will be found that manufacturing by passing between slitting rollers as above described is more economical than other methods of manufacture and results in a very stable and uniform product.

What we claim is:—

1. An accumulator plate including a sheet of expanded metal stiffened by a rigid member formed with a wavy groove in which the expanded metal is located and fixed, said expanded metal being made on a bias whereby the sheet is given a spine which is parallel to one edge.

2. An accumulator plate including a sheet of expanded metal stiffened by a rigid member formed with a wavy groove in which the expanded metal is located and fixed, said expanded metal being made on a bias whereby the sheet is given a spine which is parallel to a vertical edge.

3. An accumulator plate including a punched sheet of expanded metal, said expanded metal being made on a bias whereby the sheet is given a spine which is parallel to one edge.

4. An accumulator plate including a sheet of expanded metal carried by a rigid bar formed with a wavy groove in which the expanded metal is located and fixed, said sheet having insulating edge framing, comprising lengths of C-sectioned insulating material having the open ends of the C located in grooves formed near the sheet edges.

HARRY SALMON.
ERNEST THOMAS WILLIAMS.